(12) United States Patent
Morelos-Zaragoza et al.

(10) Patent No.: US 6,741,613 B1
(45) Date of Patent: May 25, 2004

(54) HYBRID STATE MACHINE FOR FRAME SYNCHRONIZATION

(75) Inventors: Robert-Henry Morelos-Zaragoza, Tokyo (JP); Rajesh Juluri, San Jose, CA (US); Chusong Xiao, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/480,220

(22) Filed: Jan. 10, 2000

(51) Int. Cl.[7] ................................................. H04J 3/06
(52) U.S. Cl. ........................ 370/503; 375/134; 375/137
(58) Field of Search ................................. 370/503, 509, 370/510, 512–514, 324, 350, 520; 375/240.27, 240.28, 262, 134, 137, 145, 149

(56) References Cited

U.S. PATENT DOCUMENTS 5,710,783 A * 1/1998 Luthi et al. .................. 714/755
5,835,165 A * 11/1998 Keate et al. ............ 375/240.27

* cited by examiner

*Primary Examiner*—Phirin Sam
(74) *Attorney, Agent, or Firm*—Christopher P. Maiorana, PC

(57) ABSTRACT

An apparatus comprising a first stage and a second stage. The first stage may have a first plurality of states connected by a first topology. The second stage may have a second plurality of states connected by a second topology. The second topology may be different from the first topology.

20 Claims, 4 Drawing Sheets

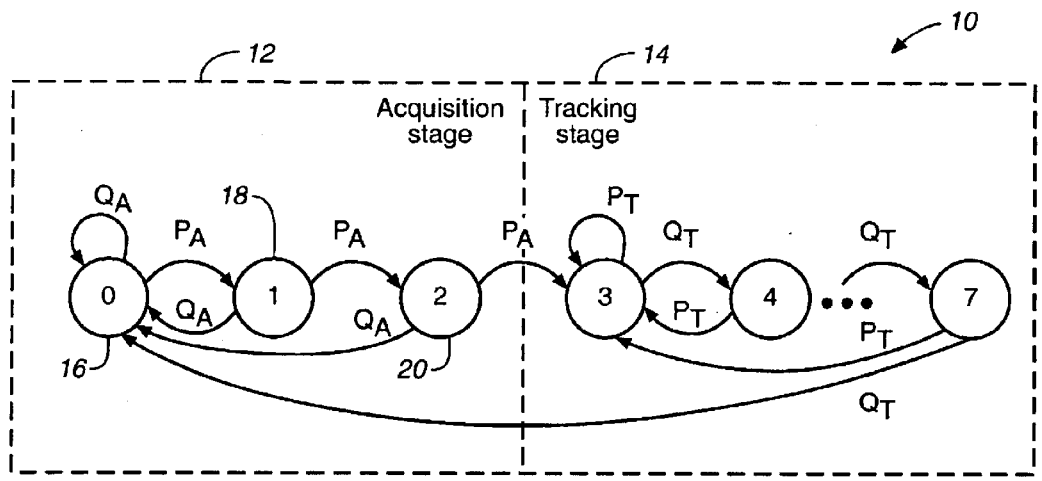
FIG._1
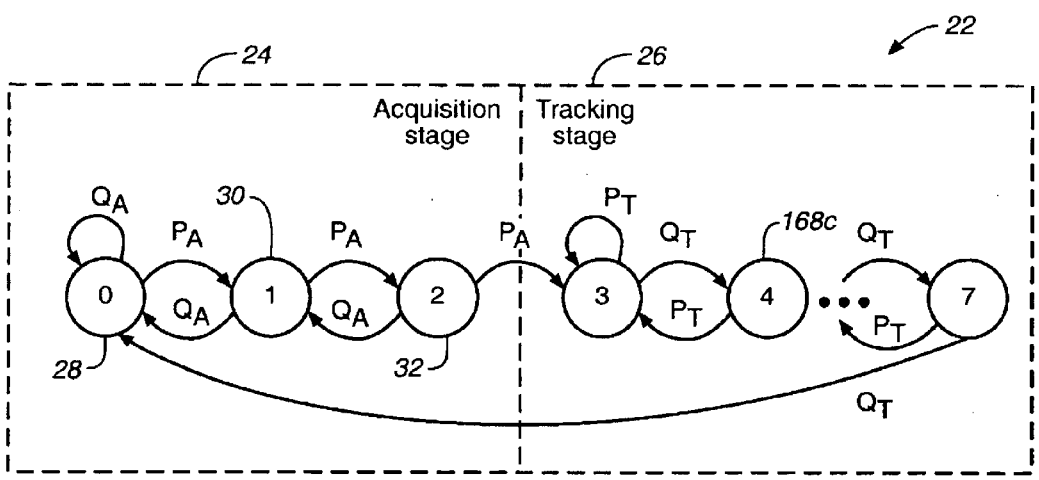
FIG._2

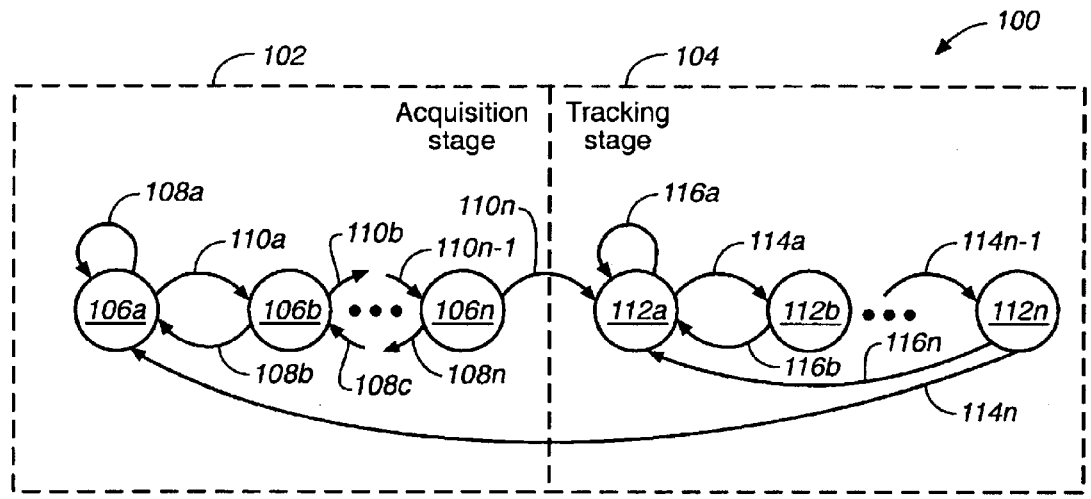
FIG._3
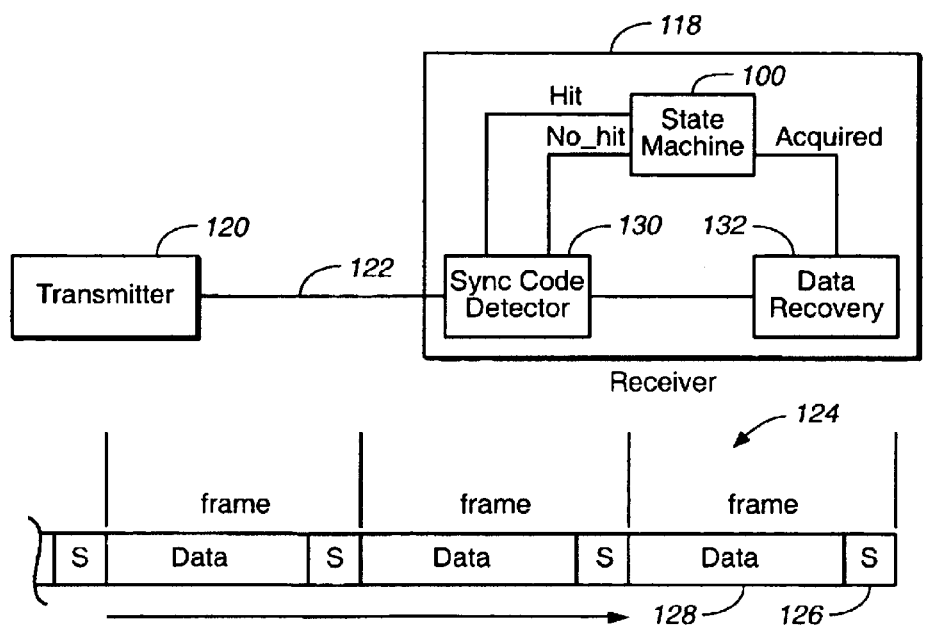
FIG._4

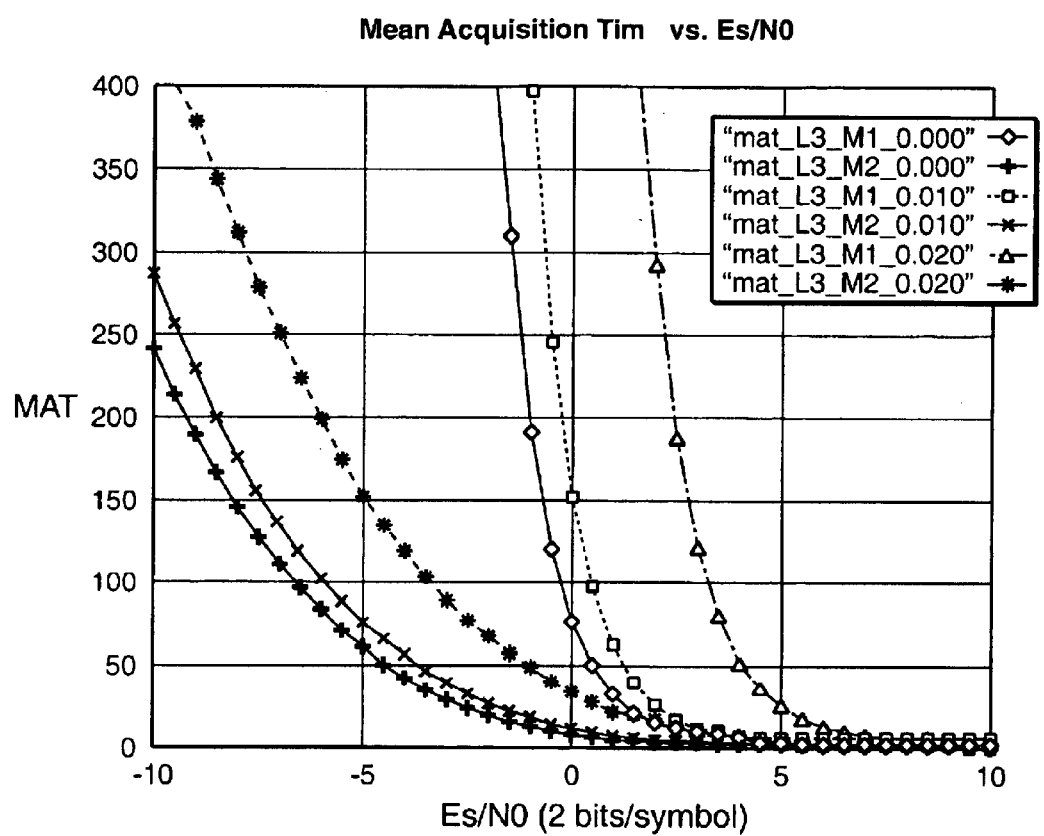
FIG._5

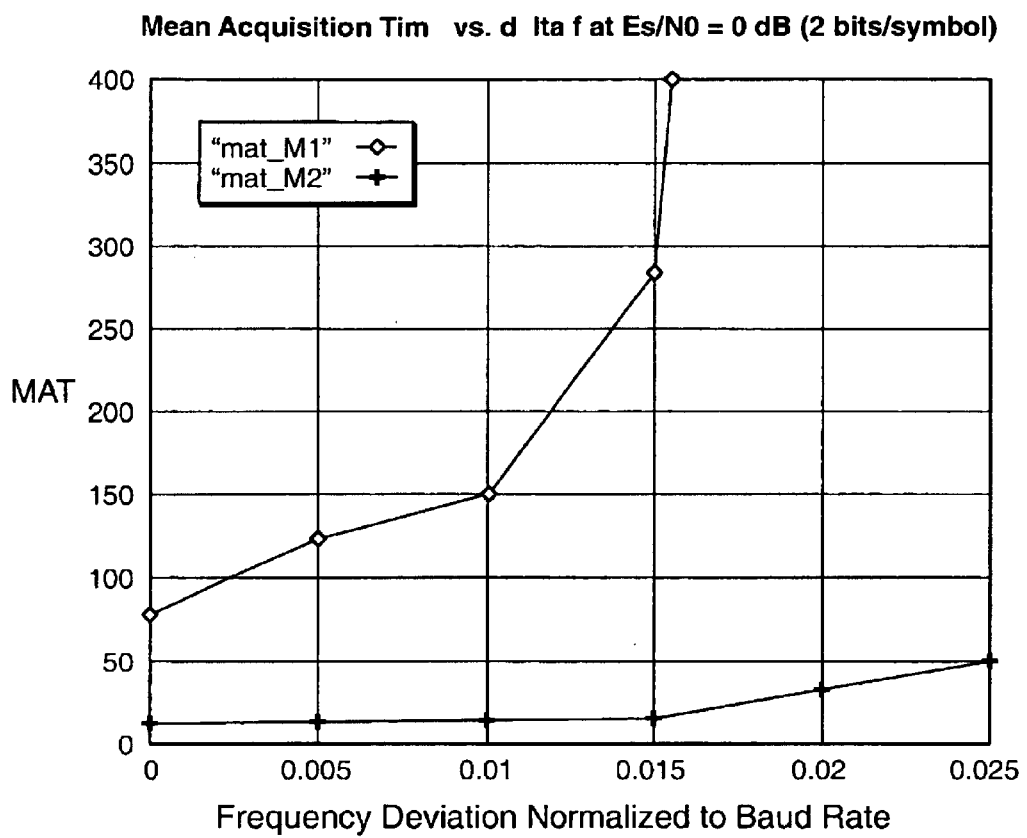
FIG._6

HYBRID STATE MACHINE FOR FRAME SYNCHRONIZATION

FIELD OF THE INVENTION

The present invention relates to binary data transmissions generally and, more particularly, to a hybrid state machine for frame synchronization in digital transmissions.

BACKGROUND OF THE INVENTION

Data may be serially transmitted one bit at a time along it, a data transmission path. The serial data can be transmitted in groups of bits called frames. The frames are delimited by synchronization codes that identify the beginning or the end of each frame. The synchronization codes must be identified in the data stream before the significance of the data contained in the frame can be determined. When a synchronization code is identified, a signal can be generated to synchronize a data recovery circuit to the contents of the frame. The synchronization of the data recovery circuit to the frame is frame synchronization.

The process of frame synchronization can be divided into an acquisition phase and a tracking phase. Each of the phases can be managed by a synchronization state machine. In the acquisition phase, the synchronization state machine moves to a next state each time a "hit" occurs (e.g., a synchronization code is identified). If a "no-hit" occurs (e.g., a synchronization code is expected but not identified), the synchronization state machine moves to a previous acquisition state if one exists. When a predetermined number of "hits" occur in a row, the data signal is considered acquired. The synchronization state machine can generate a signal indicating that the synchronization of the data signal is acquired.

With the synchronization of the data signal acquired, the frame synchronization process switches to the tracking phase. In the tracking phase, the synchronization state machine moves to a next tracking state each time a "no-hit" occurs. If a "hit" occurs, the synchronization state machine moves to a previous tracking state, if one exists. When a predetermined number of "no-hits" occur in a row, tracking of the data signal is considered lost. With the tracking of the data signal lost, the frame synchronization process switches back to the acquisition phase. The synchronization state machine can generate a signal indicating that lock has been lost.

Conventional synchronization state machines used for frame synchronization usually have identical topologies for the acquisition phase and the tracking phase. The topology of a synchronization state machine defines the connections between synchronization states. Since the topologies of both phases are identical, conventional synchronization state machines for frame synchronization have either long acquisition and tracking times or short acquisition and tracking times. A synchronization state machine with the smallest mean acquisition time (MAT) is said to have an optimistic acquisition stage. Conversely, a synchronization state machine with the longest MAT is said to have a pessimistic acquisition stage. A similar characterization can be made with respect to the tracking stage. Using the mean time to loose lock (MTLL) as a parameter, a synchronization state machine with the smallest MTLL is said to have a pessimistic tracking stage. A synchronization state machine with the longest MTLL is said to have an optimistic tracking stage.

Referring to FIG. 1, a state diagram illustrating a conventional synchronization state machine (SSM) 10 is shown. The synchronization state machine 10 has an acquisition stage 12 and a tracking stage 14. The acquisition stage 12 has three states 16, 18 and 20. When a "hit" occurs, the acquisition stages moves forward one state (e.g., the arrows marked $P_A$). When a "no-hit" occurs, the acquisition stage moves back to the first acquisition state 16 (e.g., the arrows marked $Q_A$)). Each time a "no-hit" occurs, the acquisition process must start over. In order for the synchronization state machine 10 to consider the synchronization acquired, 3 "hits" must occur in a row (or a number equal to the number of states in the acquisition stage). The mean acquisition time of the acquisition stage 12 is the longest for a given number of states. The tracking stage 14 uses the same topology as the acquisition stage. When a "hit" occurs during tracking, the tracking phase moves backward to the first tracking state (e.g., the arrows marked $P_T$). When a "no-hit" occurs during tracking, the tracking stage moves forward one state (e.g., the arrows marked $Q_T$) Since a single "hit" will start the tracking sequence over, the tracking phase 14 has the longest mean time to lose lock for a given number of states. The synchronization state machine 10 has a pessimistic acquisition stage and an optimistic tracking stage.

Referring to FIG. 2, a state diagram illustrating a another conventional synchronization state machine 22 is shown. The synchronization state machine 22 has an acquisition stage 24 and a tracking stage 26. The acquisition stage 24 has three states 28, 30 and 32. When a "hit" occurs, the acquisition stage moves forward one state (e.g., the arrows marked $P_A$). When a "no-hit" occurs, the acquisition stage moves backward one state (e.g., the arrows marked $Q_A$) Since a "no-hit" only moves the acquisition stage 24 back one state, the acquisition stage 24 will have the shortest mean acquisition time for a given number of states.

The tracking stage 26 uses the same topology as the acquisition stage. When a "hit" occurs during tracking the tracking stage 26 moves backward one state. When a "no-hit" occurs, the tracking phase moves forward one state. Like the acquisition stage, the tracking stage will have the shortest mean time to lose lock. The synchronization state machine 22 has an optimistic acquisition stage and a pessimistic tracking stage.

Ever increasing data transmission rates require that data recovery circuits quickly acquire a lock on the data transmissions and track the transmissions without losing the lock for as long as possible. The synchronization state machine 10 and the synchronization state machine 22 cannot meet these requirements. While the synchronization state machine 10 can track a transmission for the longest period, the synchronization state machine 10 also requires the longest time to acquire a lock on the transmission. Conversely, the synchronization state machine 22 can acquire a lock on a transmission in the shortest time. However, the synchronization state machine 22 also loses the lock in the shortest time. A synchronization state machine is needed that can provide a short mean acquisition time and a long mean time to lose lock.

SUMMARY OF THE INVENTION

The present invention concerns an apparatus comprising a first stage and a second stage. The first stage may have a first plurality of states connected by a first topology. The second stage may have a second plurality of states connected by a second topology. The second topology may be different for the first topology.

The objects, features and advantages of the present invention include providing a hybrid state machine for frame synchronization that may (i) have two different topologies to define connections between synchronization states, (ii) use one topology to minimize means acquisition time and a second topology to maximize mean time to lose lock, and/or (iii) provide added flexibility in trading-off time to recover from a false lock and tracking time.

BRIEF DESCRIPTION OF THE DRAWINGS

These and other objects, features and advantages of the present invention will be apparent from the following detailed description and the appended claims and drawings in which:

FIG. 1 is a state diagram illustrating a conventional synchronization state machine;

FIG. 2 is a state diagram illustrating another conventional synchronization state machine;

FIG. 3 is a state diagram illustrating a synchronization state machine according to a preferred embodiment of the present invention;

FIG. 4 is a block diagram illustrating the state machine of FIG. 3 in the context of a serial transmission receiver;

FIG. 5 is a graph illustrating mean acquisition times of a conventional state machine and the state machine of FIG. 3; and FIG. 6 is a graph illustrating mean acquisition time as a function of normalized frequency deviation.

DETAILED DESCRIPTION OF THE PREFERRED EMBODIMENTS

Referring to FIG. 3, a state diagram of a synchronization state machine (SSM) 100 is shown in accordance with a preferred embodiment of the present invention. The synchronization state machine 100 generally comprises an acquisition stage 102 and a tracking stage 104. The acquisition stage 102 may have a plurality of acquisition states 106a–106n. In one example, the acquisition stage 102 may have 3 acquisition states. However, the number of acquisition states may be determined to meet the design criteria of it a particular application. The state 106a may be an initial, or start-up, acquisition state. The synchronization state machine 100 generally waits for a "hit" (e.g., the detection of a synchronization code) or a "no-hit" (e.g., the failure to detect a synchronization code) to occur. When a "no-hit" occurs, the synchronization state machine 100 generally moves backward from a current acquisition state to a previous acquisition state (e.g., from a state $106_i$ to a state $106_{i-1}$) as indicated by the pathways 108a–108n. When a "hit" occurs, the synchronization state machine 100 generally moves forward from the current acquisition state to a next acquisition state (e.g., from a state $106_i$ to a state $106_{i+1}$) as indicated by the pathways 110a–110(n-1). If a "hit" occurs when the synchronization state machine 100 is in the acquisition state 106n, the synchronization state machine 100 generally moves to the tracking stage 104. The synchronization state machine 100 may be configured, in one example, to generate a signal indicating that the tracking stage 104 has been entered.

The tracking stage 104 generally comprises a plurality of tracking states 112a–112n. In one example, the tracking stage 104 may have 5 tracking states. However, the number of tracking states may be determined to meet the design criteria of a particular application. The tracking state 112a may be an initial tracking state of the tracking stage 104. When the synchronization state machine 100 is in the acquisition state 106n, a "hit" will generally move the synchronization state machine 100 into the initial tracking state 112a. When a "no-hit" occurs during the tracking phase, the synchronization state machine 100 generally moves forward from a current tracking state to a next tracking state (e.g., from a state $112_i$ to a state $112_{i+1}$) as indicated by the pathways 114a–114(n-1). If a "no-hit" occurs when the synchronization state machine 100 is in the tracking state 112n, the synchronization state machine 100 generally moves to the initial acquisition state 106a (e.g., the pathway 114n). The synchronization state machine 100 may be configured, in one example, to generate a signal that indicates that the tracking stage has been exited. When a "hit" occurs during the tracking phase, the synchronization state machine 100 generally moves from the current state to the initial tracking state (e.g., from a state $112_i$ to the state 112a) as indicated by the pathways 116a–116n.

The acquisition stage and the tracking stage generally have different topologies. By using a different topology (e.g., the connections between synchronization states) for each of the two synchronization phases, the state machine 100 generally provides a connection between states that may (i) minimize the mean acquisition time for a given number of acquisition states and (ii) maximize the mean time to lose lock for a given number of tracking states. The number of acquisition states may be chosen to optimize the acquisition of lock while minimizing the probability of false locks. The number of tracking states may be chosen to optimize the trade off between minimizing the time to recover from a false lock and maximizing the mean time to losing lock. The synchronization state machine 100 may be, in one example, a "hybrid" realization of a state machine for synchronization, in which the acquisition stage uses transitions between adjacent states and the tracking stage uses transitions between states and the initial tracking state.

The function performed by the state machine 100 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

Referring to FIG. 4, a block diagram illustrating an application of the state machine 100 is shown. The state machine 100 is shown implemented as part of a serial data transmission receiver 118. The state machine 100 may be configured, in one example, to generate a signal (e.g., ACQUIRED) in response to a detection signal (e.g., HIT) and a detection signal (e.g., NO-HIT). The signal ACQUIRED may indicate that the state machine 100 has entered the tracking stage as described in connection with FIG. 3.

The receiver 118 may be connected to a transmitter 120 by a data transmission path 122. The transmitter generally sends a serial data transmission 124 along the transmission path 122 to the receiver 118. The serial data transmission 124 is generally dividing into frames. Each frame generally contains a synchronization code 126 and data 128.

The receiver 118 may comprise a synchronization code detector 130 and a data recovery circuit 132. The synchronization code detector 130 may be configured, in one example, to generate (i) the signal HIT in response to detecting the synchronization code 126 and (ii) the signal NO-HIT in response to not detecting the synchronization code 126.

Noise on the transmission path 122 may make it difficult to detect the synchronization code 126. The synchronization code detector 130 may be configured to compensate for noise by detecting the synchronization code 126 with less than a perfect match. For example, if the synchronization code 126 has 20 bits, the synchronization code detector 130 may be configured to generate the signal HIT in response to detecting 17 of the 20 bits. The 3 bit error would represent a noise tolerance of the synchronization code detector 130.

The data recovery circuit 132 may be configured, in one example, to recover the data 128 from the serial data transmission 124 in response to the signal ACQUIRED.

Referring to FIG. 5, a chart comparing the theoretical mean acquisition time (MAT) of the synchronization state machine 100 and the conventional synchronization state machine 10 is shown. The chart plots mean acquisition time versus frequency offset, normalized with respect to symbol rate. The computations of the MATs are based on an acquisition stage with 3 states and a tolerance (e.g., the maximum number of hard decision decoded bits in error with respect to a unique word of length 20 bits) of 3 bits. Binary phase shift keying (BPSK) and additive white gaussian noise (AWGN) are assumed.

Referring to FIG. 6, a chart comparing the MATs of the synchronization state machine 100 and the synchronization state machine 10 as a function of frequency deviation, normalized to baud rate at $E_s/N_o$=0dB (2 bits/symbol), is shown. The same general assumptions apply as in connection with FIG. 4.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   an acquisition stage having at least three acquisition states; and
   a tracking stage having at least three tracking states, wherein (a) during said acquisition stage said apparatus is configured to move (i) from a current acquisition state to a next acquisition state in response to detection of a synchronization code in a serial data transmission and (ii) from a current acquisition state to an immediately preceding acquisition state in response to a failure to detect said synchronization code and (b) during said tracking stage said apparatus is configured to move from a current tracking state to an initial tracking state in response to detection of said synchronization code.

2. The apparatus according to claim 1, wherein said apparatus comprises a state machine.

3. The apparatus according to claim 2, wherein said state machine comprises a synchronization state machine (SSM).

4. The apparatus according to claim 3, wherein said synchronization state machine is configured for synchronization of frames in a data transmission path.

5. The apparatus according to claim 1, wherein said acquisition stage is configured to minimize a mean acquisition time (MAT) of said apparatus.

6. The apparatus according to claim 1, wherein said tracking stage is configured to maximize a mean time to lose lock (MTLL) of said apparatus.

7. The apparatus according to claim 1, wherein said plurality of acquisition states comprises three states.

8. The apparatus according to claim 1, wherein said plurality of tracking states comprises five states.

9. The apparatus according to claim 1, wherein said apparatus is configured to move from a last acquisition state to said initial tracking state in response to detection of said synchronization code in said serial data transmission.

10. The apparatus according to claim 1, wherein said apparatus is further configured to move from a last tracking state to an initial acquisition state in response to a failure to detect said synchronization code.

11. The apparatus according to claim 1, wherein said apparatus is further configured to move from said current tracking state to a next tracking state in response to a failure to detect said synchronization code.

12. The apparatus according to claim 1, further comprising a data recovery circuit configured to recover data from said serial data transmission in response to a signal indicating that synchronization is acquired.

13. An apparatus comprising:
    means for providing an acquisition stage comprising at least three acquisition states; and
    means for providing a tracking stage comprising at least three tracking states, wherein (a) during said acquisition stage said apparatus is configured to move (i) from a current acquisition state to a next acquisition state in response to detection of a synchronization code in a serial data transmission and (ii) from a current acquisition state to an immediately preceding acquisition state in response to a failure to detect said synchronization code and (b) during said tracking stage said apparatus is configured to move from a current tracking state to an initial tracking state in response to detection of said synchronization code.

14. A method for synchronizing frames in a serial data transmission comprising the steps of:
    (A) monitoring said serial data transmission for a synchronization code;
    (B) maintaining a current state;
    (C) if said current state is one of at least three acquisition states, moving to a next acquisition state in response to detection of said synchronization code and moving to an immediately preceding acquisition state in response to a failure to detect said synchronization code; and
    (D) if said current state is one of at least three tracking states, moving to an initial tracking state in response to detection of said synchronization code.

15. The method according to claim 14, wherein a state machine is used to maintain said current state among said at least three acquisition states and said at least three tracking states.

16. The method according to claim 15, wherein said state machine is part of a serial data transmission receiver.

17. The method according to claim 14, wherein step (C) further comprises the sub-step of:
    if said synchronization code is detected and said current state is a last state of said at least three acquisition states, moving to an initial state of said at least three tracking states.

18. The method according to claim 14, wherein step (D) further comprises the sub-step of:
    if said synchronization code is not detected and said current state is a last state of said at least three tracking states, moving to an initial state of said at least three acquisition states.

19. The method according to claim 14, wherein said acquisition stages are configured to minimize a mean acquisition time (MAT).

20. The method according to claim 14, wherein said tracking states are configured to maximize a mean time to lose lock (MTLL).

* * * * *